United States Patent [19]

Lohest

[11] 4,371,823
[45] Feb. 1, 1983

[54] APPARATUS AND METHOD FOR STARTING TEXTILE WINDER SYNCHRONOUS MOTOR DRIVES

[75] Inventor: Hans Lohest, Remscheid, Fed. Rep. of Germany

[73] Assignee: Barmag Barmer Maschinenfabrik AG, Remscheid, Fed. Rep. of Germany

[21] Appl. No.: 219,966

[22] Filed: Dec. 24, 1980

Related U.S. Application Data

[63] Continuation of Ser. No. 20,539, Mar. 14, 1979, abandoned.

[30] Foreign Application Priority Data

Mar. 15, 1978 [DE] Fed. Rep. of Germany ....... 2811123

[51] Int. Cl.³ .............................................. H02P 1/04
[52] U.S. Cl. .................................... 318/705; 318/723; 318/780
[58] Field of Search ............... 318/722, 723, 778–780, 318/709, 705

[56] References Cited

U.S. PATENT DOCUMENTS

| | | | |
|---|---|---|---|
| 2,852,726 | 9/1958 | Ocnaschek | 318/722 X |
| 3,307,092 | 2/1967 | Trocchio | 318/722 |
| 3,787,724 | 1/1974 | Pederson et al. | 318/778 X |

FOREIGN PATENT DOCUMENTS 2029460 12/1971 Fed. Rep. of Germany .
2127455 8/1976 Fed. Rep. of Germany .

OTHER PUBLICATIONS

ASEA-Zeitschrift 1976, Jahrg. 21, Heft 4, pp. 75-80.

*Primary Examiner*—B. Dobeck
*Attorney, Agent, or Firm*—Bell, Seltzer, Park & Gibson

[57] ABSTRACT

An apparatus and method for accelerating textile winder synchronous motor drives from standstill to rated running speed wherein a synchronous motor is first accelerated asynchronously to a first intermediate speed, then decelerated to and synchronized at a second intermediate speed, then accelerated synchronously to rated speed, while thereby limiting current drawn by the motor to levels not exceeding rated current. The method is automatically followed using apparatus which varies motor input frequency responsive to a predetermined sequence of control signals supplied from a signal source via a transient response profiler which converts sudden changes in signal strength to smooth, gradual changes. As more specifically described herein, only two controllers are needed, and a switching network including time-delay devices selectively supplies one signal or the other via an integrator to a variable frequency converter.

11 Claims, 3 Drawing Figures

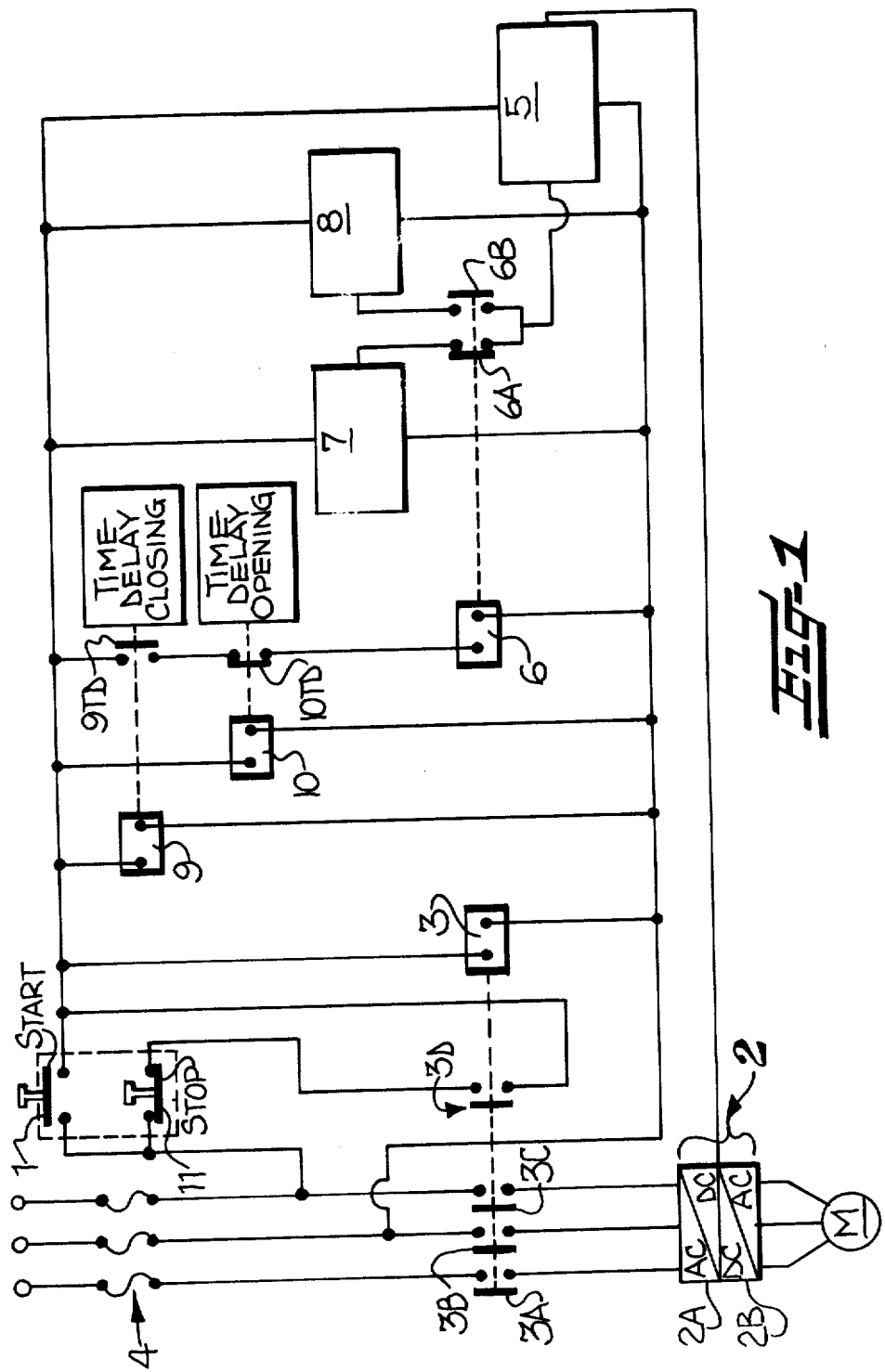

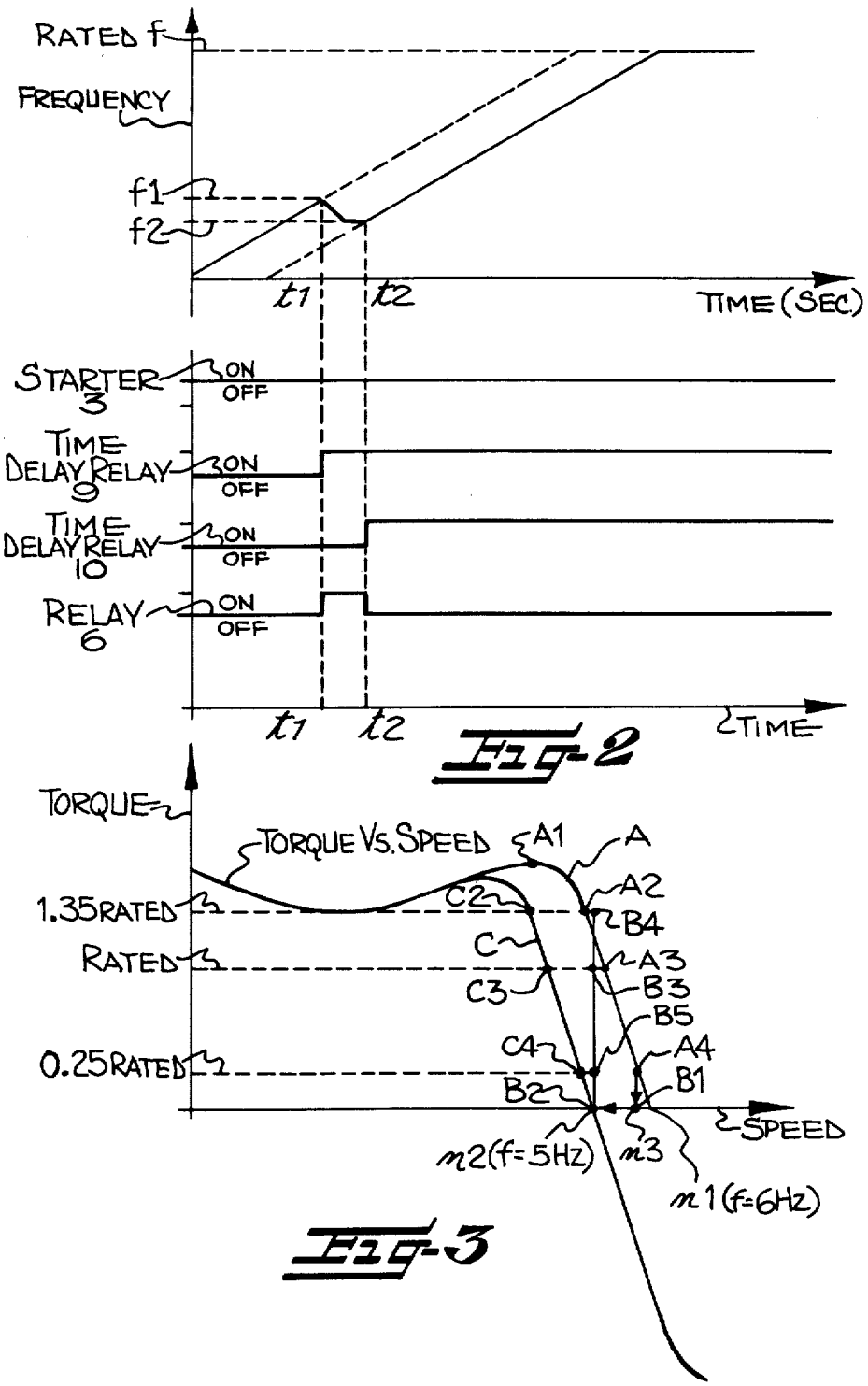

APPARATUS AND METHOD FOR STARTING TEXTILE WINDER SYNCHRONOUS MOTOR DRIVES

RELATED APPLICATIONS

This application is a continuing application from copending application Ser. No. 020,539 filed Mar. 14, 1979 now abandoned.

FIELD AND BACKGROUND OF THE INVENTION

High-speed textile yarn winders conventionally employ a surface drive roll to drive a rotating tube or similar package core receiving yarn arriving at a predetermined linear speed. Such surface drive rolls are normally driven at a suitable constant rotational speed by synchronous motors. One such winder is, for example, disclosed in Schippers et al U.S. Pat. No. 3,861,607. The disclosure made in such patent is, to any extent deemed necessary for a full understanding of the present invention, hereby incorporated by reference into this specification.

Synchronous motor speed is in proportion to the frequency of the supplied alternating current and is as constant as such frequency. Normally, three phase alternating current is supplied to such motors by a frequency converter either rotary or solid state, typically consisting of an AC to DC converter operating from power line frequency, coupled to a DC to AC inverter connectable to the motor. Output frequency and motor speed have conventionally been adjustable by supplying a control signal to one of the intermediate DC stages.

For accelerating synchronous motor drives from standstill to rated synchronous running speed, its rotor has an auxiliary induction-type start-up winding. By supplying rated frequency for start-up, the motor will draw current up to twenty times rated full-load current thereby requiring that both the frequency converter and the motor be designed and built to handle currents much larger than needed to drive a high-speed winder. This approach has been expensive and, as winder speeds have increased, the expense has become prohibitive.

Several solutions to this problem have been suggested, wherein each motor or group of motors are provided with two frequency converters. In an example of this approach, one converter accelerates the motor asynchronously from standstill to a certain speed, where synchronization is effected. The frequency of this converter is than raised up to the rated frequency for driving the motor at the operational speed. The other converter then takes over to drive the motor for the winding operation. This approach has the disadvantage that the first converter and the motor must still be oversized in order to accommodate the larger than rated current demanded by the motor from the converter during mechanical synchronization at any given speed. Thus, disproportionate expense is only partially avoided, for the expense of the second converter must be added to that of oversizing.

SUMMARY OF THE INVENTION

With the above discussion in mind, it is an object of this invention to provide an apparatus and method for starting a textile winder synchronous drive wherein only one converter is used, and wherein neither the converter nor the motor need have a current capacity in substantial excess if rated full-load current. In realizing this object, apparatus and methods are provided wherein the motor is accelerated asynchronously at a first frequency from standstill to a first intermediate speed, wherein the frequency is then lowered down to a second lower frequency corresponding to or lower than first intermediate speed in such a way that the motor is synchronized at said second frequency and wherein the frequency is then gradually raised up to the operational rated frequency in order to then gradually accelerate the motor synchronously up to its rated speed. Preferably said first frequency is same as said operational frequency corresponding and being synchronous to said rated speed.

It is a further object of this invention to provide apparatus whereby the aforesaid method is accomplished automatically. In realizing this object, apparatus is provided wherein a predetermined sequence of control signals effective to provide the frequencies which are synchronous and correspond to the aforesaid intermediate and rated speed is supplied to the converter via apparatus which converts sudden and stepwise change of the control signal from said second lower frequency to said operational rated frequency into a gradual, continuous change over a predetermined period of time. By this method and apparatus the aforesaid second frequency can be raised to said rated frequency without danger that the motor is desynchronized.

By employing the apparatus and method of this invention, considerable technical and economic advantage is obtained, since the current drawn thereby does not substantially exceed rated current. Thus, small converters may now be tailored to serve individual or small groups of motors no larger than needed for normal winder loads. General purpose converters can serve a wide number and variety of motor requirements through the simple addition of apparatus for sensing and limiting converter output current.

BRIEF DESCRIPTION OF THE DRAWINGS

Some of the objects and advantages of the invention having been stated, other objects and advantages will appear as the description proceeds, when taken in connection with the accompanying drawings, in which:

FIG. 1 is a schematic circuit diagram of a synchronous motor and the arrangement provided by the invention for accelerating the motor from standstill to rated speed;

FIG. 2 is a graphical representation of the operation of the provided apparatus in carrying out the provided method, as a function of time; and FIG. 3 is a typical torque-speed characteristic curve for the induction-type auxiliary winding of a synchronous motor, illustrating motor behavior during acceleration in accordance with method and apparatus of the invention.

DETAILED DESCRIPTION OF THE INVENTION

While the present invention will be described hereinafter with more particularity, and with particular reference to the accompanying drawings in which a preferred embodiment for the invention is shown, it is to be understood at the outset of the description which follows that the present invention is contemplated as being subject to modification by persons skilled in the applicable arts once an understanding of the present invention has been gained. Accordingly, the detailed description and accompanying drawings are to be understood broadly as directed to teaching persons skilled in the art the general utility of the present invention, and not as limiting the scope of the invention.

Briefly stated, the apparatus of this invention includes means for supplying a synchronous motor with alternating current electrical power at a frequency determinable by controlled signals delivered to the supply means. In the illustrated embodiment of the present invention (FIG. 1) such a means preferably takes the form of a frequency converter 2, operatively connected with a synchronous motor M. The frequency converter 2, as is known to persons skilled in the applicable arts, may consist of an AC to DC converter 2A and a DC to AC inverter 2B, supplied with electrical power from a conventional three-phase line through starter contacts 3A, 3B, and 3C and overload protector devices 4. As will be recognized by persons skilled in the arts of motor control, the supply means 2 may take the form of an appropriate semiconductor or solid state circuit.

Means are provided, in accordance with the present invention, for generating a preselected sequence of control signals to be delivered to the frequency converter 2, with the sequence of control signals corresponding to a preselected sequence of alternating current frequencies effective to accelerate the motor M from standstill to a rated running speed. In the form illustrated, the means for generating the sequence of control signals comprises a switching network including a sequencing relay having a coil 6 and an associated pair of contacts 6A, 6B and two time-delay relays having coils 9, 10 and respective contact sets 9TD, 10TD. As pointed out more fully hereinafter, a sequence is determined, and time delays are adjusted empirically, to accomplish a sequence of asynchronous acceleration, followed by deceleration to synchronization, followed by synchronous acceleration to a rated speed.

In order to provide for gradual and continuous changes in control signals supplied to the fraquency converter 2 from a starting-mode controller 8 and running-mode controller 7, means 5, preferably in the form of a function generator, is interposed between the supply means 2 and the generating means 7, 8 for delivering the preselected sequence of control signals from the generating means to the supply means while converting any stepwise sudden changes in the sequence of control signals into gradual and continuous changes over predetermined periods of time. Preferably, the control signals converting means 5 takes the form of an integrator circuit which supplies what is, in essence, a ramp function to the frequency converter 2.

In operation, a start button 1 energizes the coil 3 of a starter, closing normally-open contacts 3A, 3B, 3C and supplying electrical power to the frequency converter 2. An associated contact set 3D closes, providing continuous single-phase power to the control circuit and locking closed the starter.

With energization of the control means circuitry, a control signal is supplied from the running mode controller 7 through a normally closed contact set 6A of the sequencing relay 6 to the integrator 5. The integrator supplies to the converter 2 a control signal which is, in essence, a positive-slope ramp function. As a consequence, the frequency of alternating current electrical power delivered to the motor M increases gradually from a minimum, thus accelerating the motor asynchronously without drawing excessive current.

At the same time the coils 9, 10 of the adjustable time-delay relays have also been energized. Following a first preset period of time, a normally-open contact set 9TD closes, thereby energizing the coil 6 of the sequencing relay. Energization of the coil of the sequencing relay causes the normally-closed contacts 6A to open, and closes an associated normally-open contact set 6B. Thus, the integrator 5 is disconnected from the running-mode controller 7, while the starting-mode controller 8 supplies a control signal through the closed sequencing contact set 6B to the integrator 5, and thence to the converter 2.

After a second preset period of time, a normally-closed contact set 10TD opens, thereby de-energizing the coil 6 of the sequencing relay. Upon such occurrence, the normally-closed contact set 6A again closes and the normally-open contact set 6B opens again, disconnecting the starting-mode controller 8 from the integrator 5 and reconnecting the running-mode controller 7 thereto. The control signal from the running-mode controller 7 is thus again fed through the integrator 5 to the converter 2, and will continue until the stop switch 11 is actuated to de-energize the starter and circuit.

Thus, in a textile winder having the motor M coupled by any conventional means such as a surface drive roll, to a winding spool chuck the motor M and roll are accelerated from standstill to a synchronous running speed by accelerating the motor asynchronously to a first predetermined speed by setting the frequency to a first frequency of the alternating current supplied. The frequency is then lowered to a second predetermined frequency which is lower than or equal to the synchronous hypothetical frequency of said first predetermined speed thereby synchronizing the motor at essentially said first predetermined or lower speed. This occurs while the magnitude of the current drawn by the motor from the source is maintained at levels not exceeding a predetermined amount. If desired, it is contemplated that means may be provided for sensing the magnitude of the current drawn from the supply by the motor and for maintaining the magnitude at levels not exceeding that required by the motor under rated full-load running conditions. Persons skilled in the art of using and controlling synchronous motors will be able to appreciate the possibility of providing such a current magnitude sensing and controlling means and will be able to incorporate such circuitry into the circuitry shown and described here. As explained above the switching network at a predetermined point in time substitutes the starting-mode controller for the running-mode controller, which has been adjusted to provide a signal corresponding to a second frequency less than that which the converter has reached at the time substitution occurs and preferably less than the hypothetical frequency corresponding to said first motor speed. Thus, the converter receives a negative-slope ramp function from the integrator, gradually reduces its output frequency until it has reached said second frequency. During this time the motor may decelerate until it synchronizes at the lower speed, while drawing essentially only normal current. Indeed, by decelerating the motor may generate and feed energy back to the converter, causing a temporary increase in voltage-to-frequency ratio, further facilitating synchronization.

After a time lapse predetermined to be sufficient to permit synchronization, the switching network substitutes the running-mode controller for the starting-mode controller, and the converter receives a positive-slope ramp function from the integrator. The frequency received by the motor gradually increases to rated frequency, and the motor gradually accelerates synchronously to rated speed.

Referring now to FIG. 2, note that the lower portion depicts the condition at each point in time of each of the starter, time-delay and sequencing relays 3, 9, 10 and 6, while the upper portion depicts alternating current frequency supplied to the motor on the same time scale. Control circuit events, such as a contact closing or opening, as shown on the lower portion, are correlated via vertical dotted lines with output frequency changes, as shown on the upper portion.

At time T0, the starter 3 energizes. During the period from T0 to a predetermined time T1, the converter 2 receives a positive-slope ramp function from the integrator 5, and output frequency increases gradually from a minimum to frequency f1, as shown. Such minimum frequency is the intercept of the time and frequency axes in the upper portion of FIG. 2, but is not necessarily zero Hertz.

At time T1, the normally-open time-delay contacts 9TD close, energizing the sequencing relay 6, while at a second predetermined time T2, the normally closed time-delay contacts 10TD open, de-energizing the sequencing relay 6. During the period T1-T2, the sequencing relay 6 is energized, the converter 2 receives a negative-slope ramp function from the integrator 5, and the frequency supplied decreases gradually, as shown from f1 to f2. The negative-slope time interval T1-T2 has been empirically chosen to be longer than necessary for output frequency to reach steady state at a level determined by the starting-mode controller 8.

Subsequent to time T2, the sequencing relay 6 is de-energized, the converter 2 again receives a positive-slope ramp function from the integrator 5, and the frequency supplied increases gradually and continuously, as shown, until rated frequency is reached. Frequency remains at rated value until stop button 11 is pushed.

Thus, as depicted by FIG. 2, frequency changes during each of the three time periods occur linearly at a particular rate of change, as the integrator 5 converts sudden changes in control signal level into gradual, continuous changes. It should be understood, however, that different rates of change can be used and that any gradual continuous change may be somewhat non-linear, depending upon the integrator and upon motor characteristics. In any given instance, particular components must be selected such that the motor in question behaves during starting in accordance with the method of the invention, as described above.

Shown in FIG. 3 are two typical torque-speed curves for synchronous motor auxiliary windings of the induction motor type. For illustrative purposes, curves C and A are assumed to be those appropriate, respectively, for frequencies of 5 and 6 Hz, which frequencies are further assumed to equal f2 at time T2 and f1 at time T1, respectively.

During a first predetermined time period T0-T1, the frequency is increased is increased from a minimum to f1 (6 Hz), and the motor M accelerates asynchronously until it reaches a point on the linear portion A2-A4 on curve A—for example, point A4 at speed N3. During a second predetermined time period T1-T2, the frequency is reduced from f1 (6 Hz) to f2 (5 Hz) and the motor M will first assume no-load conditions at speed N3 and point B1, and then decelerate to speed N2 at point B2, where it synchronizes. The motor M will now operate synchronously along line B2-B4, if frequency is maintained at 5 Hz. Such operation is at constant speed regardless of load torque, provided that an assumed pullout torque of 1.35 times the rated torque is not exceeded.

Subsequent to the second period, after a predetermined time T2, gradually increasing frequency accelerates the motor synchronously to rated speed. This is not shown on FIG. 3, but can be readily envisioned. For each increment of increased frequency, synchronous operation line B2-B4 will be displaced incrementally to the right, while remaining vertical. A rated frequency, it would be located somewhere off the right edge of the page. Using the circuit as shown in FIG. 1 the rated frequency is delivered by the running mode controller. That means that the rated frequency is same as the first predetermined frequency f1 or vice versa. In this case operation line of the synchronized motor is on the vertical to the intersection of line A to the horizontal "speed" ordinale.

In practice, with certain types of motors, operation during the first time period T0-T1 occurs with the synchronous rotor filed winding de-energized. Modern motors however like those of Siemens- W. Germany of the SIMOSYN-TYP have a constant magnetic rotor and don't need energizing of the magnetic rotorfield via slip rings. In any case the current drawn by the auxiliary asynchronous winding is, however, by my invention very low because the motor is either coasting to a lower speed or gradually accelerating asynchronously, but never synchronized by means of the asynchronous winding.

If, however, the prior starting technique is used and for example a frequency of 5 Hz is supplied for operating the motor synchronously at the speed N2, the auxiliary winding by asynchronous acceleration under high current conditions would bring the motor to point C4 on curve C in FIG. 3. The motor would operate inefficiently on the portion C2-C3-C4 as an induction motor, at a non-constant speed dependent on load torque. To synchronize the motor to the speed N2, it is necessary to accelerate it to point B5 at speed N2. This can only be done by supplying the field winding with large amounts of current while it slips poles trying to pull-in mechanically. If inertial torque is too high, it may never synchronize.

In the drawings and specifications, there has been set forth a preferred embodiment of the invention, and although specific terms are employed, they are used in a generic and descriptive sense only and not for purpose of limitation.

Similarly, persons of ordinary skill in the arts relating to motor design and application will recognize other known principles to be followed in practical applications of this invention with a range of types of motors capable of synchronous operation.

That which is claimed is:

1. A method for accelerating a synchronous motor for standstill to rated synchronous running speed, comprising:
   coupling a synchronous motor to a variable frequency source of alternating current;
   accelerating said motor asynchronously to a first predetermined intermediate speed lower than rated running speed by increasing the frequency of said current according to a first predetermined function; then decelerating said motor to a second predetermined intermediate speed lower than said first intermediate speed by decreasing the frequency of said current according to a second predetermined function, thereby synchronizing said motor at said second intermediate speed; and then accelerating said motor synchronously from said second intermediate speed to the rated running speed by increasing the frequency of said current according to a gradual third predetermined function; while thereby maintaining the magnitude of the current drawn by the motor from said source at levels not exceeding a predetermined amount.

2. A method according to claim 1, wherein said first predetermined function further comprises increasing the frequency of said current at a preselected rate of increase effective to asynchronously accelerate said motor to said first predetermined speed while maintaining the current drawn by said motor at a level not exceeding a predetermined amount.

3. A method according to one of claim 1 wherein said first predetermined function further comprises increasing the frequency of said current gradually over a predetermined period of time effective to asynchronously accelerate said motor to said first predetermined speed while maintaining the current drawn by said motor at a level not exceeding a predetermined amount.

4. A method according to one of claim 1 wherein said third predetermined function further comprises increasing said frequency at a predetermined rate effective to permit said motor to accelerate synchronously from said second predetermined speed to rated running speed, while maintaining the current drawn by said motor at levels not exceeding a predetermined amount.

5. A method according to one of claim 1 wherein said third predetermined function comprises increasing said frequency gradually over a predetermined period of time effective to permit said motor to accelerate synchronously from said second predetermined speed to rated running speed, while maintaining the current drawn by said motor at levels not exceeding a predetermined amount.

6. A method as in claim 1 wherein for accelerating said motor asynchronously the frequency is increased to a first predetermined frequency and for decelerating said motor the frequency is decreased to a second predetermined frequency and for accelerating said motor synchronously the frequency is gradually increased to the rated operational frequency.

7. A method as in claim 6 wherein said first predetermined frequency is equal to said rated operational frequency.

8. A method for accelerating a synchronous motor drive for a textile winding machine from standstill to rated running speed, while maintaining the current drawn by said motor at levels not exceeding a predetermined amount, comprising:

coupling at least one synchronous motor to drive the winding machine and to a source of alternating current the frequency of which is determinable by a control signal supplied to said source;

acclerating said motor asynchronously to a first intermediate speed lower than the rated running speed by generating and supplying to said source a control signal effective to set the frequency of said current to a first predetermined value; then decelerating said motor to a second intermediate speed lower than said first intermediate speed by generating and supplying to said source a control signal effective to set the frequency of said current to a second predetermined value lower than said first value, thereby synchronizing said motor at said second intermediate speed; and then accelerating said motor synchronously from said second intermediate speed to rated running speed by generating and supplying to said source a control signal effective to gradually increase the frequency of said current according to a predetermined function.

9. A method according to claim 8, wherein said predetermined function further comprises increasing said frequency at a predetermined rate effective to permit said motor to accelerate synchronously from said second predetermined speed to rated running speed.

10. A method according to claim 8, wherein said predetermined function further comprises increasing said frequency gradually over a predetermined period of time effective to permit said motor to accelerate synchronously from said second predetermined speed to rated running speed.

11. A method according to claim 8, wherein said first predetermined value of frequency is equal to the frequency synchronously associated with rated running speed.

* * * * *